(12) United States Patent
Van Druten et al.

(10) Patent No.: US 11,690,473 B2
(45) Date of Patent: Jul. 4, 2023

(54) SYSTEM FOR AERATING A LIQUID FOOD PRODUCT, AND A METHOD FOR PREPARING A LIQUID FOOD PRODUCT (71) Applicant: FrieslandCampina Nederland B.V., Amersfoort (NL)

(72) Inventors: Wiebe Nicolaas Van Druten, Wageningen (NL); Maarten Botman, Wageningen (NL)

(73) Assignee: FRIESLANDCAMPINA NEDERLAND B.V., Amersfoort (NL)

( * ) Notice: Subject to any disclaimer, the term of this patent is extended or adjusted under 35 U.S.C. 154(b) by 496 days.

(21) Appl. No.: 16/643,683

(22) PCT Filed: Sep. 14, 2018

(86) PCT No.: PCT/EP2018/074931
§ 371 (c)(1),
(2) Date: Mar. 2, 2020

(87) PCT Pub. No.: WO2019/053210
PCT Pub. Date: Mar. 21, 2019

(65) Prior Publication Data
US 2020/0221898 A1 Jul. 16, 2020

(30) Foreign Application Priority Data

Sep. 15, 2017 (EP) ..................................... 17191326

(51) Int. Cl.
*A47J 31/44* (2006.01)
*A47J 31/52* (2006.01)
(Continued)

(52) U.S. Cl.
CPC ......... *A47J 31/4485* (2013.01); *A23C 9/1524* (2013.01); *A23P 30/40* (2016.08);
(Continued)

(58) Field of Classification Search
CPC .. A47J 31/525; A47J 31/4485; A47J 31/4496; B01F 23/235; A23C 9/1524; A23C 2210/30
See application file for complete search history.

(56) References Cited

U.S. PATENT DOCUMENTS 3,213,592 A * 10/1965 Rich .................. B01D 19/0057
494/900
4,663,089 A * 5/1987 Lowry .................... C02F 1/645
261/23.1
(Continued)

FOREIGN PATENT DOCUMENTS

CN 1649654 8/2005
EP 2 189 085 A1 5/2010
(Continued)

OTHER PUBLICATIONS

"Espresso Latte Art Knowledge: 6 Factors Affecting Milk Foam", Gafei.com, Coffee Technologies, Mar. 12, 2015.
(Continued)

*Primary Examiner* — Anthony J Weier
(74) *Attorney, Agent, or Firm* — Sunit Talapatra; Foley & Lardner LLP (57) ABSTRACT

The invention relates to a system for aerating a liquid food product, wherein the system includes a bubble generator (5) for generating bubbles in a liquid food product flow. The bubble generator (5) includes a wall (23) having gas transmissive pores, which wall separates an air supply space (24) from the liquid food product flow, wherein an air supply (4) is provided for supplying air to the air supply space (24). The air supply (4) includes an air drying device (7) for drying air, preferably dehumidifying air, to be supplied to the air supply space (24) and/or a container (8) containing pre-dried air, said container (8) being arranged for supplying dried air to the air supply space.

19 Claims, 5 Drawing Sheets (51) Int. Cl.
    *B01F 3/04*     (2006.01)
    *A23C 9/152*     (2006.01)
    *A23P 30/40*     (2016.01)
    *B01F 23/235*     (2022.01)

(52) U.S. Cl.
    CPC ......... *A47J 31/4496* (2013.01); *A47J 31/525* (2018.08); *B01F 23/235* (2022.01); *A23C 2210/30* (2013.01)

(56) References Cited

U.S. PATENT DOCUMENTS

| | | | |
|---|---|---|---|
| 6,619,054 B1* | 9/2003 | Cargnelli | F28F 13/12 62/93 |
| 8,544,692 B2 | 10/2013 | Rusch et al. | |
| 2012/0269945 A1 | 10/2012 | Wijnen et al. | |
| 2013/0319259 A1* | 12/2013 | Ait Bouziad | A47J 31/44 99/452 |
| 2015/0313274 A1 | 11/2015 | Emanuel | |

FOREIGN PATENT DOCUMENTS

| | | |
|---|---|---|
| JP | 2010-533626 A | 10/2010 |
| WO | WO-2014/069993 A1 | 5/2014 |

OTHER PUBLICATIONS

Google Translation for "Espresso Latte Art Knowledge: 6 Factors Affecting Milk Foam", Gafei.com, Coffee Technologies, Mar. 12, 2015.
English translation of First Office Action received in Chinese application No. 2018800590467, dated Aug. 27, 2021.
International Search Report dated Mar. 12, 2018 in International Application No. PCT/EP2018/074931, 5 pages.

* cited by examiner

SYSTEM FOR AERATING A LIQUID FOOD PRODUCT, AND A METHOD FOR PREPARING A LIQUID FOOD PRODUCT

CROSS-REFERENCE TO RELATED APPLICATIONS

This application is the National Phase of International Patent Application No. PCT/EP2018/074931, filed Sep. 14, 2018, published on Mar. 21, 2019 as WO 2019/053210 A1, which claims priority to European Patent Application No. 17191326.2, filed Sep. 15, 2017. The contents of these applications are herein incorporated by reference in their entirety.

The invention relates to a system for preparing a liquid food product, in particular a foamed liquid food product, comprising a bubble generator.

The invention also relates to a method for preparing a liquid food product, in particular a foamed liquid food product, such as foamed or frothed milk product.

Systems for preparing a liquid food product are known from WO-A1-2014/069993. According to WO-A1-2014/069993 a bubble generator is connected to a liquid flow and a gas flow. The liquid flow comprises a liquid food product, such as milk product. The liquid flow passes along the bubble generator, through which a gas flow is supplied to the liquid flow for preparing a foamed liquid food product, such as milk product foam and froth. Although the liquid food product prepared by the liquid food product system of WO-A1-2014/069993 is of high quality, it is desired to improve the reliability and stability of the quality of the foamed liquid food product.

In addition there exists a long felt need in the art to provide assemblies and systems for preparing a foamed liquid food product, especially when the prepared foamed liquid food product contains a perishable liquid food product such as milk product, to reduce the effect of external conditions on the prepared foamed liquid food product, in particular when the assemblies or systems are used in different cycles and/or environments, such as high or low temperature climates, environments with high or low humidity, during start-up, intermittent or continuous use cycles over a prolonged period of time.

Furthermore, it is desired to reliably prepare a high quality foamed liquid food product with relatively inexpensive and durable means using only a relatively low amount of energy.

It is therefore an object of the present invention to provide an alternative system for preparing a foamed liquid food product, with which in particular a foamed liquid food product such as foamed or frothed milk product, can be prepared reliably with a high quality with reduced dependency on external conditions.

Thereto, the present disclosure provides for a system for aerating a liquid food product, wherein the system comprises a bubble generator for generating bubbles in a liquid food product flow. The bubble generator comprises a wall having gas transmissive pores, which wall separates an air supply space from the liquid food product flow, wherein an air supply is provided for supplying air to the air supply space. The air supply comprises an air drying device for drying air, preferably dehumidifying air, to be supplied to the air supply space and/or a container containing pre-dried air, said container being arranged for supplying dried air to the air supply space.

Furthermore, the present disclosure provides for a method for preparing a liquid food product, for instance, a foamed liquid food product, such as milk foam or froth, wherein incoming air is dried and/or dry air is supplied to the incoming air before said air is supplied to a liquid food product flow, wherein the incoming air is preferably dried to a relative humidity below 90% such as, for instance below 80%, 75% or 70%, at least when the air is introduced to the liquid food product flow through the bubble generator.

The invention further relates to a system for preparing a liquid food product, such as a foamed liquid food product. The system comprises a water supply arranged for detachable connection to a supply water inlet of a coupling device for supplying water to the system. The system further comprises an air supply for providing air to the system. The air supply is arranged for supplying dry, preferably at least dehumidified, air under pressure to the bubble generator of said system, wherein the air supply is configured for detachable connection to the bubble generator of said system. The water supply of the system can e.g. be a water reservoir or can be provided by a connection to the water mains. This system is a particularly user-friendly system and can be easily designed to dispense product in a reliable, hygienic manner.

According to an aspect of the invention the system can be provided with a compressor for supplying air under pressure to the air supply space. In embodiments of a system for preparing a foamed liquid food product according to the invention, the air supply can be configured to supply air to an air supply space connected to or comprised by the bubble generator at a slight overpressure, the overpressure preferably being in a range between 0.05 to 0.5 MPa, more preferably in a range between 0.1 and 0.3 MPa. In embodiments the air supply can comprise a gas holder with a gas pump and/or the air supply can comprise a compressor, preferably with regulating means, for providing a gas flow rate of 0.2 to 1.0 Normal liter/min, preferably 0.25 to 0.75 Normal liter/min. In this manner a sufficient gas flow rate can be obtained to introduce gas, especially air, via the bubble generator into the product.

In the following, air is discussed as the gas to be supplied to the bubble generator. However, according to alternative embodiments, the gas can comprise, for instance, an inert gas or another gas or gas mixture, for example containing nitrogen or carbon dioxide. Air from the ambient atmosphere is a relatively inexpensive source of gas that can be supplied to the system for preparing a foamed liquid food product. In addition, air from the ambient atmosphere is advantageous for the stability of the prepared foamed liquid food product. By using ambient air the system does not need to be fitted with an internal air supply or reservoir that takes up space in the system and has to be replaced when it becomes empty, or at least a smaller reservoir can be used.

In embodiments according to this disclosure the bubble generator comprises gas transmissive pores having a pore size in the range of 0.1-0.5 microns, in particular a pore size of at least 0.15 micron and less than 0.45 microns, for forming micro bubbles.

The liquid food product contained within the system or a container being part of the system can be an undiluted food product or a drink base, such as for a (fruit) juice/drink, an alcohol-containing drink or drink base, for instance beer or wine or a drink base therefore, a dairy or dairy-based drink, for instance, a whey drink or permeate-based drink, (milk) shake, chocolate milk, (drinking) yoghurt, sauce, ice cream or dessert. The invention is in particular advantageous when the contained liquid food product is a milk based product. The product can further comprise, for example, vegetable or animal fat or oil, a thickener, sugar, sweeteners, flavoring, coloring and/or the like, and/or various other ingredients.

The liquid food product can be pure or can be mixed with a liquid, such as for example water.

In embodiments according to the invention, the bubble generator comprises or can be formed by or as a filter, which filter can comprise a hydrophobic material. In this manner the filter repels water and possible contaminants contained therein at an air side of said filter. This allows the system to be used in a hygienic way. Additionally or alternatively, in a system according to the invention, the filter can comprise a filtration surface comprising gas transmissive pores such that gas can be provided to the liquid food product in a sterile way, without the liquid food product passing through the filter. The filter can also be arranged for equal distribution of a gas volume flow therein and the generation of bubbles on a surface or a wall along which surface the liquid food product flows.

In embodiments in a system according to the invention, the filter can comprise, but is not limited to, a tubular microfiltration wall having gas transmissive pores, said microfiltration wall comprising a hydrophobic material. The bubble generator can for example comprise a microfiltration device, wherein the microfiltration device can comprise a hydrophobic material such as a HEPA (High-Efficiency Particulate Air) filter to provide gas in a sterile manner. A HEPA filter can lead to a very hygienic manner of preparing the foamed food product. The bubble generator can comprise a microfiltration device, wherein the microfiltration device for instance can combine the functions of equal distribution of a gas volume flow and the generation of microbubbles on a surface or said microfiltration wall along which surface the liquid food product flows. An additional or alternative function of the microfiltration device may be to filter the supplied gas flow from microorganisms and or small particles. An attractive foamed food product can be provided by using the microfiltration device, for instance a microfiltration device such as disclosed in WO-A1-2014/069993, for supplying gas to a liquid food product to prepare milk product foam or froth. Of course, it is possible to use other filters or configurations, which will be apparent to the person skilled in the art.

In embodiments according to the disclosure, the air supply can be provided with an air inlet that is connected to the ambient atmosphere. In embodiments, the air inlet can be provided with a filter for limiting relatively large particles from passing the air inlet. In embodiments, the air supply can be connected to or formed by as a container containing gas, for example gas under pressure, such as air under pressure, more specifically dry air.

In embodiments according to the disclosure, the air drying device can be provided for heat transfer between air from the air supply and water from the water supply. In embodiments, a relatively high heat transfer rate can be established by having the air from the air supply flowing within the air drying device in a direction substantially opposite to a direction of the flow of water from the water supply in said air drying device.

In embodiments, the air drying device can comprise a cooler, which cooler can comprise a material with a thermal conductivity of at least 90 W/m/K, preferably at least 200 W/m/K. Preferably, said material can be a metal or an alloy, such as, but not limited to, brass and/or aluminum. Materials with a suitable thermal conductivity can facilitate the heat transfer between the air and the relatively cold water within the air drying device, which can be beneficial for the drying or dehumidifying of the incoming air.

In order to further elucidate the present invention, embodiments thereof shall be disclosed and discussed hereafter, with reference to the drawings in which.

In this description embodiments are shown and described of the invention, by way of example only. These should by no means be interpreted or understood as limiting the scope of the present invention in any way. In this description the same or similar elements are indicated by the same or similar reference signs. In this description embodiments of the present invention shall be discussed with reference to preparing foamed liquid food products, especially milk foam or froth. However, other liquid food products could also be used in the present invention.

It is noted that a foamed liquid food product can be understood as, but is not limited to a food product which is at least partly foamed or at least partly frothed. The foamed liquid food product may thus comprise a foam fraction and a still substantially liquid fraction. Although the foamed liquid food product may also be substantially fully foamed or substantially fully frothed.

Figure 1:
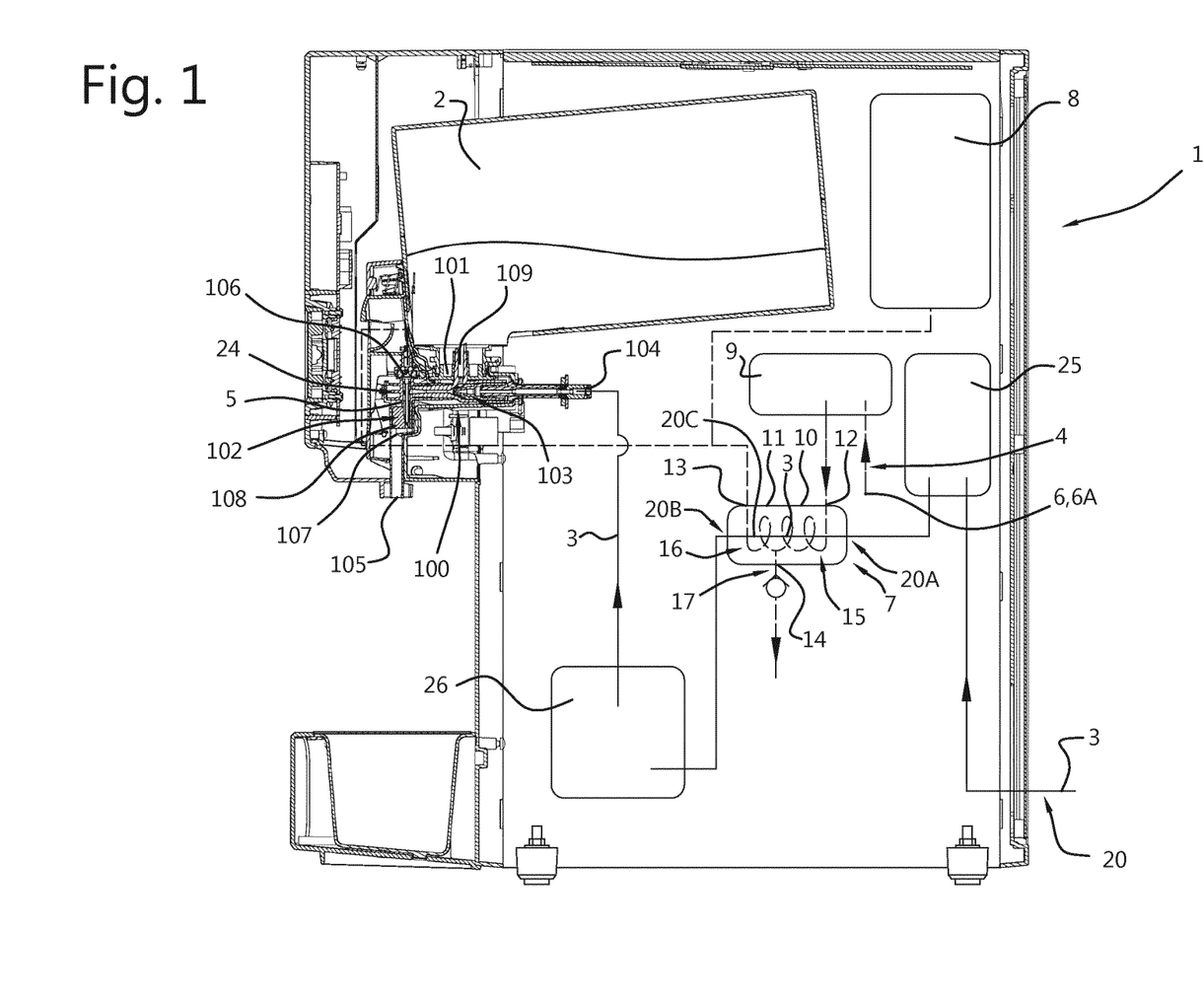
FIG. 1 shows a schematic view in cross section of an embodiment of a system for preparing a liquid food product, in particular a foamed food product according to the invention, which system comprises an air drying device.
Figure 1A:
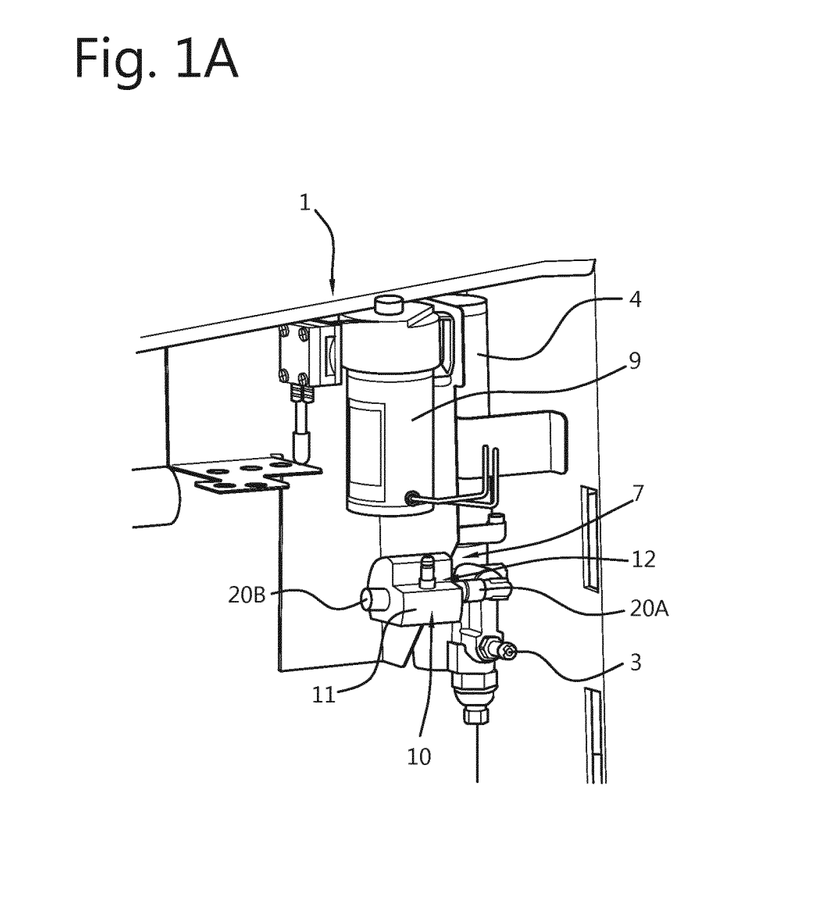
FIG. 1A shows a schematic perspective view of a system of FIG. 1.

As an example a milk product foaming device in or for a coffee machine is shown in FIG. 1 and FIG. 1A, as for example a milk product foaming device such as described in WO-A1-2014/069993. The system comprises a coupling device that couples a water inlet, a milk inlet and a gas inlet. The coupling device further comprises a prepared foamed liquid food product outlet. Water is supplied to the water inlet from a water supply, for example a water reservoir. The water supply can for example also be provided by a connection to a water main. Dairy based liquid is supplied to the milk inlet from a container containing liquid dairy product, such as a carton, a bag-in-box, or a reservoir. In an aspect of the invention the container and/or the coupling device can be disposable which can easily be installed and removed from the milk foaming device or coffee machine. In another aspect of the invention, the gas inlet can be detachably connected to an air supply, the water inlet can be detachably connected to a water supply and the milk inlet can be detachably connected to a container arranged for containing a liquid dairy product. This may allow for easy installation and maintenance of the coupling device. In embodiments, water is added to the liquid dairy product upstream of the gas inlet in a hygienic manner.

Gas is supplied to the gas inlet from an air supply, which can be an air inlet connected to the ambient atmosphere. Additionally or alternatively this could comprise a container comprising pressurized gas, such as pressurized air, especially relatively dry or dehumidified air, as will be discussed. The gas, especially air, is for aerating a liquid food product flow, such as a mixture of water and dairy based liquid. The gas is supplied to the mixture of water and dairy based liquid through a bubble generator for equal distribution of a gas volume flow and for generating bubbles, especially micro bubbles in said mixture. The mixture of water, dairy based liquid and gas is discharged from the foamed liquid food product outlet as a foam or froth into for example coffee, cappuccino, café latte or cortado. In this manner milk product foam or froth can be provided. In another aspect of the invention the coupling device can be provided as an eductor, such as for example disclosed in WO-A1-2016/043590. The use of an eductor makes it possible to on the one hand add such an amount of water to the dairy based liquid that after mixing with the water a liquid food product is obtained with a substantially normal amount of dry matter, or normal amount of liquid content, also called an unconcentrated liquid content herein. This provides the possibility to prepare a foamed liquid food product having a particularly pleasant taste sensation. On the other hand the eductor can be used to entrain concentrated liquid food product out of the holder by the relative underpressure caused by the water flowing there through, such that no additional devices are necessary to expel the concentrated liquid food product from the coffee machine. In this way, it is possible that a system can be manufactured relatively compactly and relatively inexpensive.

According to the invention a system according to the disclosure is arranged such that it can be operated such that only relatively dry air is supplied to the liquid food product, preferably through the bubble generator. In this description dehumidified air can be understood at least as air in which the humidity has been reduced at least partially. In this description relatively dry air can be understood as meaning air having a relative humidity below 90% such as, for instance below 80%, 75% or 70%, at least when the air is introduced to the liquid food product flow through the bubble generator.

In an aspect of the invention air from the ambient atmosphere with pressure $P_{atm}$ can be pressurized by a compressor to $P_1$, wherein $P_1 > P_{atm}$. Preferably, the compressor is configured to supply air to an air supply space connected to or comprised by the bubble generator at a slight overpressure, for example an overpressure in a range between 0.05 to 0.5 MPa, more preferably in a range between 0.1 and 0.3 MPa.

Surprisingly it has been found that the relative humidity of the air supplied to the milk product is of significant influence on the foam produced, such as, but not limited to, foam quality. It has been found that by providing relatively dry, preferably at least dehumidified air according to the invention this problem can be significantly reduced. The present invention shows that supplying relatively dry air to or in a system for preparing a foamed liquid food product improves the reliability of the quality of the prepared foamed liquid food product and improves the stability of the liquid food product preparation, especially foam or froth. It has been found that supplying relatively dry air especially has the advantage that stable and good milk foam or froth can be obtained with a foaming device as disclosed substantially irrespective of for example humidity and temperature of ambient air surrounding the device, temperature of the device itself, or whether the foam or froth is formed at the start of using the device or after having used the device for a longer period of time, and/or substantially irrespective of whether a new container of milk is used or after a substantial amount the milk has been used from such container. This can have the advantage that at any time such foam or froth of a constant quality can be supplied.

Without wanting to be bound to any theory, it appears that the improvement of the foam or froth may be obtained by preventing to a large extent water droplets forming in the bubble generator, which can block proper transport of air through pores of a wall of the filter, hence preventing proper formation of micro bubbles in the flow of the liquid food product to be foamed, especially into a mixture of liquid dairy product and water. In addition or alternatively, again without wanting to be bound to any theory, it appears improvement of the foam or froth may also be obtained by preventing to a large extent water droplets forming in the bubble generator, which can prevent proper gas volume distribution in the filter, hence leading to a build up of pressure on the remaining open pores and jetting of air through said remaining open pores. The jetting can in turn lead to a coarse foam quality which is undesirable.

FIGS. 1 and 1A schematically show a system 1 according to the disclosure, especially a foaming device 1, especially a milk foaming device 1, comprising at least a milk supply 2, a water supply 3 and an air supply 4, especially a dry air supply 4. The device 1 further comprises a coupling device 100 to which the water supply 3, milk supply 2 and air supply 4 are connected, as for example shown in FIG. 3, as will be discussed. In the coupling device 100 water, milk and gas, especially air are mixed, for forming a milk foam or froth, to be dispensed through an outlet 105 for the foam or froth, for example for dispensing the foam or froth into a cup or beaker or the like container, for example in coffee or chocolate or any suitable drink.

In the embodiment shown in FIGS. 1 and 1A, the system 1 comprises a water supply 3, which can be provided by or include a connection to the water mains. In other embodiments the water supply 3 can be provided as a water reservoir. The air supply 4 in FIGS. 1 and 1A is shown as including an air inlet 6 that is arranged for connection to the ambient atmosphere, such that ambient air can be introduced into the device through the air inlet 6. The air inlet 6 can be provided with a filter 6A for preventing larger particles to enter the air inlet 6.

Figure 3:
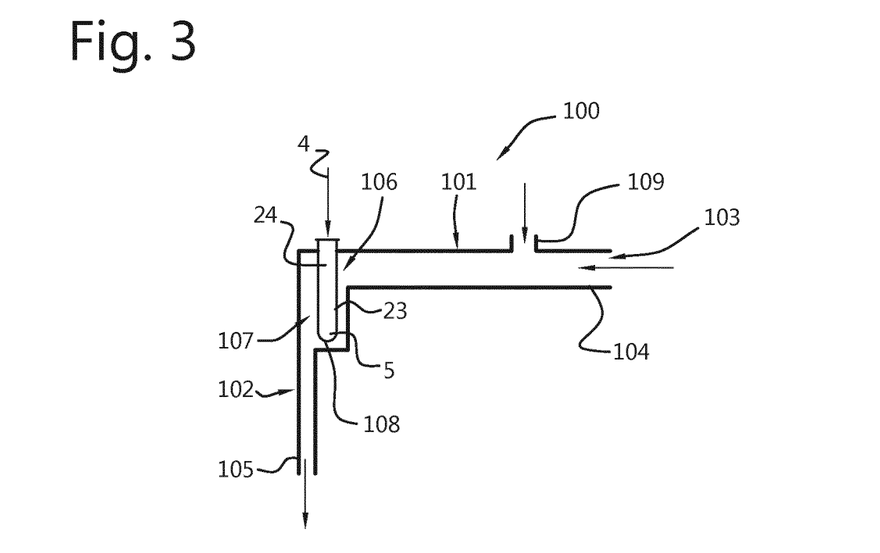
FIG. 3 shows a schematic cross sectional side view of an embodiment of a coupling device according to the invention.

As is shown in FIG. 3, the coupling device 100 can comprise a first channel portion 101 and a second channel portion 102, extending at an angle relative to each other, for example substantially perpendicularly. A first end 103 of the first channel portion 101 can form a water inlet 104 connected or to be connected to the water supply 3. The second channel portion 102 can have a first end forming an outlet end 105 during use preferably facing downward. The outlet end 105 can form a foam or froth outlet or can be connected to or can be connectable to a foam or froth outlet channel for dispensing the foam or froth. A second end 106 of the first channel portion 101 and a second end 107 of the second channel portion 102 are fluidly connected to each other in a chamber 108 to which the air supply 4 is connected, as will be explained, by a bubble generator 5, especially a micro bubble generator. Between the first and second end (103, 106) of the first channel portion 101 a milk inlet 109 is provided connected to or connectable to a milk supply 2. A coupling device 100 of a device according to the disclosure can for example be designed as an educator as disclosed in WO-A1-2016/043590, the educator therein being referenced by reference sign 4.

Figure 4A:
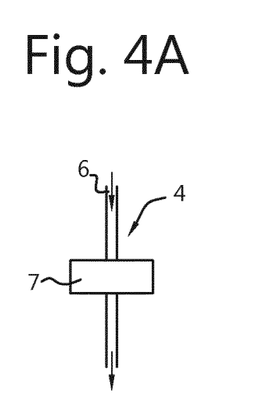
FIG. 4A shows a schematic side view of a first embodiment according to the invention of the air drying device.
Figure 4B:
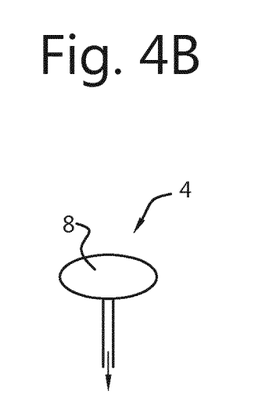
FIG. 4B shows a schematic side view of a second embodiment according to the invention of the air drying device.
Figure 4C:
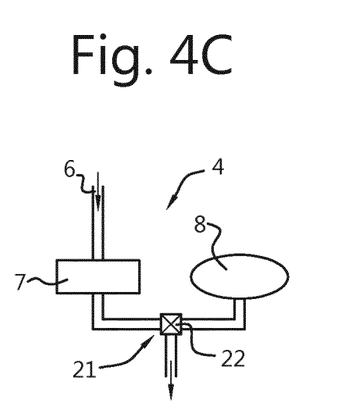
FIG. 4C shows a schematic side view of a third embodiment according to the invention of the air drying device.

As is schematically disclosed in FIG. 4A-C, an air supply for a device according to the disclosure can comprise an air inlet for ambient air (FIG. 4A), a container containing pressurized gas, such as air (FIG. 4B) or both an air inlet for ambient air and a container comprising compressed gas, such as air (FIG. 4C). These will be described further in this description.

In a device according to the disclosure a bubble generator 5 is provided for introducing micro air bubbles. The bubble generator 5 can be included in the coupling device 100, as will be described later. In the embodiment shown the bubble generator 5 comprises a microfiltration device such as disclosed in WO-A1-2014/069993, having a wall 23 comprising gas transmissive pores with a pore size of 0.6 micron. In alternative embodiments the pore size can be in the range of 0.05-10 microns, in particular in a range between 0.1 micron and 2 microns, more in particular in a range between 0.2 micron and 1.5 microns. In the present embodiment the microfiltration device can be made of a hydrophobic material, such as polypropylene (PP), which in combination with the aforementioned gas transmissive pores can function as a HEPA filter. The use of a hydrophobic material can improve the hygienic manner in which liquid food products, such as foamed food products can be prepared. It will be apparent to the person skilled in the art that other materials can be used.

As for example shown in FIG. 3, in embodiments the bubble generator 5 can be shaped such that it extends into the chamber 108 to which the air supply 4 is connected, where the second end 106 of the first channel portion 101 and the second end 107 of the second channel portion 102 are fluidly connected to each other. The bubble generator 5 can be arranged such that a flow of for example milk or a mixture of milk and water can pass the bubble generator 5 in the chamber 108, preferably substantially surrounding a wall 23 of the bubble generator 5. The bubble generator 5 can comprise a hydrophobic material such that for example milk or a mixture of milk and water may be restricted from entering said bubble generator 5. Gas is supplied through the gas transmissive pores of the wall 23 of the bubble generator 5 into the chamber 108 such that for example milk or a mixture of milk and water can be aerated. In embodiments the gas transmissive pores can have a pore size in the range of 0.1-0.5 microns, in particular a pore size of at least 0.15 micron and less than 0.45 microns, such that micro bubbles can be generated and introduced to for instance milk or a mixture of milk and water, such that high quality and attractive milk foam or froth can be produced.

As shown in FIGS. 1 and 1A, the system 1 for aerating a liquid food product can comprise the bubble generator 5 for generating bubbles in a liquid food product flow. The bubble generator 5 can comprise a wall 23 having gas transmissive pores, which wall 23 separates an air supply space 24 from the liquid food product flow. The air supply 4 can be provided for supplying gas to the air supply space 24.

In embodiments the air supply 4 can comprise an air drying device 7 for drying gas to be supplied to the air supply space 24 and/or a container 8 containing pre-dried gas. Said container 8 can be arranged for supplying dried gas to the air supply space 24. The gas preferably is or comprises air.

As shown in FIG. 4A, in embodiments, the air supply 4 can include an air inlet 6 that is arranged for connection to the ambient atmosphere, such that ambient air can be introduced into the air drying device 7, As shown in FIG. 4B, in alternative embodiments, the air supply 4 can comprise the container 8 for supplying dried gas, preferably dried air, to the air supply space 24.

As shown in FIG. 4C, in alternative embodiments, the air supply 4 can comprise the air drying device 7 for drying incoming air and the container 8 for supplying dried air. Dried air from the air drying device 7 and pre-dried air from the container 8 may also be mixed, as will be described further in this description.

In embodiments, the system 1 comprises a milk supply 2, which can be provided as comprising a container containing dairy based liquid. As discussed, the embodiment shown in FIGS. 1 and 1A also comprises a water supply 3, which can be provided by or include a connection to the water mains. In other embodiments, the water supply 3 can be provided as a water reservoir. The water supply 3 in FIG. 1 is in fluid connection with a water inlet 104 of the coupling device 100. In embodiments, the water supply 3 can be in fluid connection with a water pump 25, the air drying device 7, a heater 26 and the bubble generator 5. The air drying device 7 can be located between said water pump 25 and said heater 26. In such a manner, relatively cold water, from for example the water mains, can be supplied to the air drying device 7, which can cool the air drying device 7 and can be beneficial for drying or dehumidifying the air in the air drying device 7. After passing the air drying device 7, the water can be heated, for instance by heater 26, before it is supplied to the bubble generator 5 and mixed with the dairy based liquid, which may be beneficial for preparing a warm liquid food product that can be foamed or frothed when it passes along the bubble generator 5. In such a manner, a prepared foamed liquid food product can be obtained that may have a relatively pleasant taste sensation.

Surprisingly, it was found that the reliability and stability of the relatively high quality of the prepared liquid food product improved by supplying relatively dry air, preferably dehumidified air, to a liquid food product flow through the bubble generator 5. It was found that supplying relatively dry air to the liquid food product flow through the bubble generator 5 reduced the influence of external conditions on the prepared liquid food product. The following includes a non-limiting list of examples of external conditions that can influence the quality of the prepared liquid food product:

start-up early in the morning;
start-up with a freshly placed relatively cold container, especially a disposable container containing a liquid food product such as a dairy based product;
intermittent or continuous use of the system;
different operational settings depending on the end product, such as foam for espresso macchiato, cappuccino, café latte or cortado, especially frequent dispensing for espresso macchiato and cortado which require relatively large volumes of gas in the foamed milk fraction and relatively little liquid food product to produce high quality milk foam or froth;
the ambient temperature, which depends on the local climate and the seasons;
the temperature of the system, which depends on the production intensity and/or frequency of the system;
the relative humidity of the ambient atmosphere.

By drying or dehumidifying the incoming air or mixing the incoming air with dry air from a dry air container, high quality foamed liquid food product can be reproduced reliably over a prolonged period of time under various external conditions and for example the usage conditions, the preparation intensity and/or frequency of use.

In the exemplary embodiment shown in FIGS. 1 and 1A the air supply 4 comprises a compressor 9 for supplying air under pressure to the bubble generator in order to pass the gas transmissive pores.

In embodiments the air drying device 7 can be in fluid connection with the compressor 9 and the bubble generator 5 and the air drying device 7 can be located between said compressor 9 and said bubble generator 5. In such a manner the incoming air can be compressed before it is supplied to the air drying device 7, which can be beneficial for drying the gas. Increasing the pressure of gas increases the dew point temperature of the gas, such that condensate can start to form at higher temperatures.

The air drying device 7 can comprise a cooler 10 for cooling the incoming gas such that the gas can be cooled locally. The cooler 10 can be or comprise a condensation device 11, which can be formed as a condensate block, such that air can be dried by locally promoting and/or stimulating the formation of condensate. Additionally or alternatively, the cooler 10 can comprise piezo-electric cooling means, a liquid cooler, or the like.

Figure 2A:
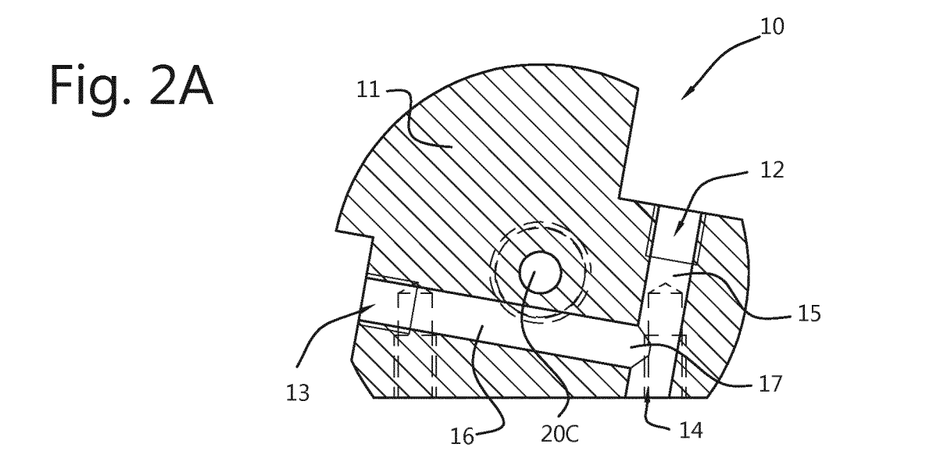
FIG. 2A shows a schematic cross section in front view of an embodiment of an air drying device according to the invention.
Figure 2B:
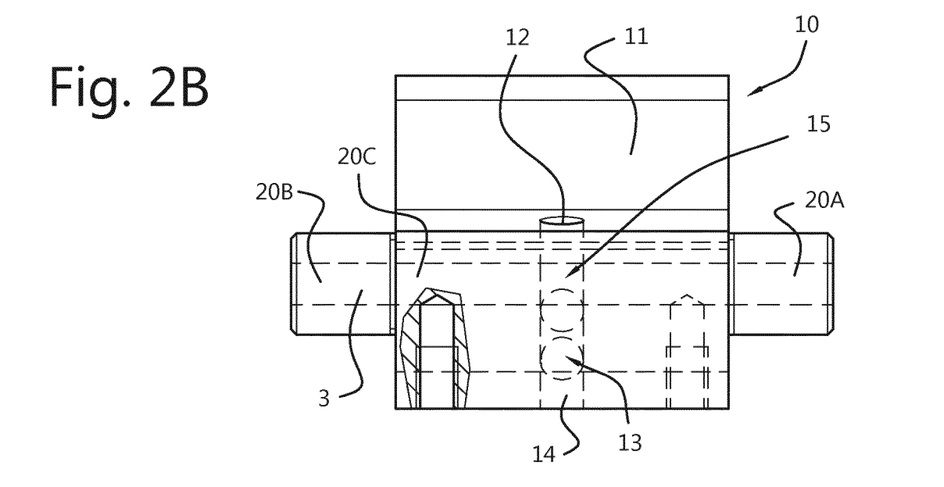
FIG. 2B shows a schematic cross section in side view of an embodiment of an air drying device according to the invention.
Figure 2C:
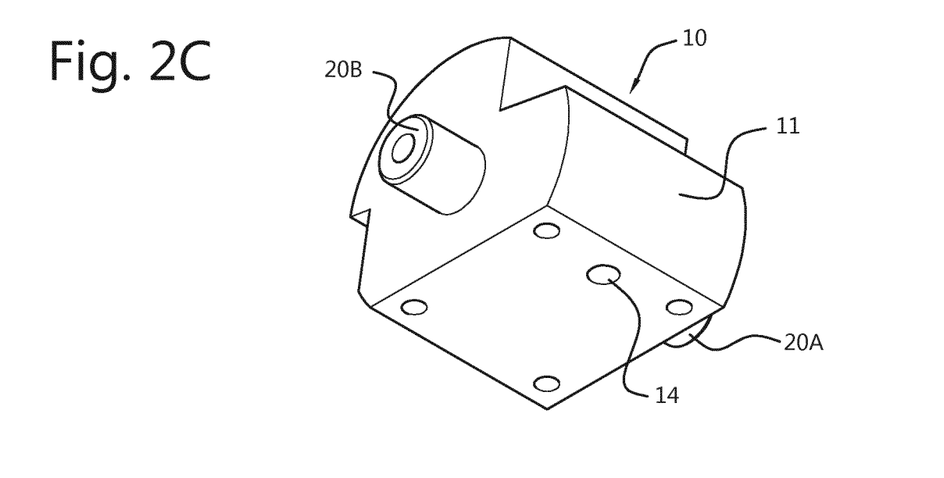
FIG. 2C shows a schematic perspective view of an embodiment of an air drying device according to the invention.

FIGS. 2A, 2B and 2C schematically show an air drying device 7 according to an exemplary embodiment of the invention. The cooler 10 can comprise an inlet channel portion 12 for supplying air, preferably air under pressure, to the cooler 10. The cooler 10 can be provided with an outlet channel portion 13 for supplying dry air to the bubble generator 5. In this case, the cooler 10 is further provided with a drainage portion 14 that is arranged for draining and/or discharging condensate.

Figure 5:
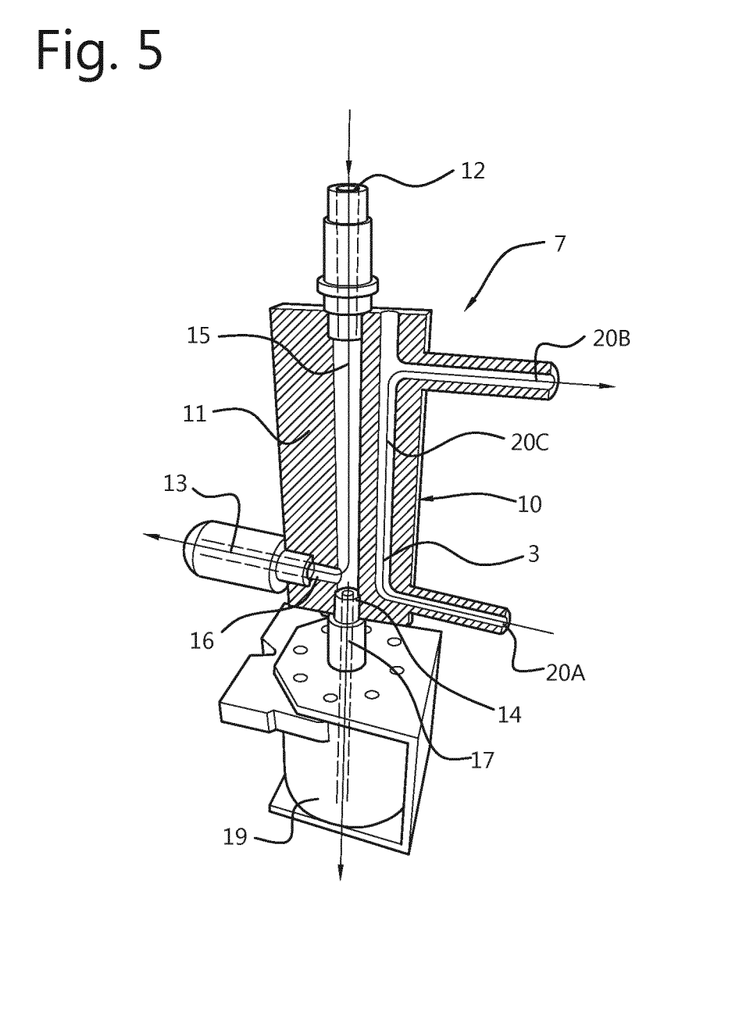
FIG. 5 shows a schematic perspective view and a partial cross section of an embodiment of an air drying device according to the invention.

FIG. 5 schematically shows a perspective view of an air drying device 7 according to a preferred embodiment of the invention. Herein, the water from the water supply 3 flows in substantially the opposite direction with respect to the air flow from the air supply 4. The cooler 10 can comprise an inlet channel portion 12 for supplying air, preferably air under pressure, to the cooler 10. The cooler 10 can be provided with an outlet channel portion 13 for supplying relatively dry air to the bubble generator 5. In embodiments, such as in the here shown embodiment, the cooler 10 can further comprise a drainage portion 14 that is arranged for draining and/or discharging condensate into a condensate container 19. Additionally or alternatively, the drainage portion 14 can be for discharging condensate within the system 1 through evaporation, and/or onto a heating plate. The drainage portion 14 may be connected to an external drain to discharge the condensate outside the system 1.

As shown in FIGS. 1, 2A, 2B, 2C and 5, the inlet channel portion 12 can be connected to the drainage portion 14 through a first channel portion 15. The flow path between the inlet channel portion and the drainage portion is preferably substantially straight, such that condensate can relatively easily be drained and/or discharged. Preferably, the straight flow path extends substantially vertically during use. The outlet channel portion 13 can be connected to the first channel portion through a second channel portion 16. Alternatively, the first channel portion 15 and second channel portion 16 can comprise a substantially U-shaped connection, or the drainage portion 14 can be provided nearer to the outlet channel portion 13. Alternatively, the first channel portion 15 and second channel portion 16 can comprise a substantially spiral shaped flow path that spirals around a channel portion 20C between a coolant inlet 20A and a coolant outlet 20B (FIG. 1). In FIG. 1, the air and water flow in substantially the same direction. However, in alternative embodiments, the air and water could also flow in substantially the opposite direction, which can be advantageous for the heat transfer between the air and the relatively cold water. It will be apparent to the person skilled in the art that variations in the channel configuration can be performed in the cooler 10 that is arranged for drying the incoming air and draining of condensate.

In embodiments according to the invention, the cooler can be provided with a normally open type valve 17. The open type valve 17 can also be provided as a manifold valve, such as a three way manifold valve, or the like. The valve 17 is arranged for adjusting from an open position I, in which the inlet channel portion 12 is in fluid connection with the drainage portion 14, to a closed position II, in which the connection to the drainage portion 14 is closed. The cooler can further comprise a control unit arranged for opening and closing said valve 17. The control unit can be configured for closing said valve 17 during a liquid food product aerating cycle. A normally open type valve can improve the drainage of condensate by actively forcing out the condensate using the pressure that is relieved after an aerating cycle and passively through evaporation in between aerating cycles and when the system 1 is not being used.

During operation of the system 1 for preparing a foamed food product, the control unit controls the operation of the valve 17, such that dry air can be supplied to the bubble generator 5 during an aerating cycle. Condensate is drained passively between aerating cycles and during stand-by of the system and condensate is drained actively at the end of an aerating cycle when the control unit opens the valve 17 to its normally open position I, in which condensate is actively drained using pressure relief after an aerating cycle.

The air drying device 7 in FIGS. 2A, 2B and 2C can further comprise a condensate container 19 for collecting condensate. In embodiments, such as the here shown embodiments, the condensate container 19 is in fluid connection with the drainage portion 14. Additionally or alternatively, the drainage portion 14 can be for discharging condensate within the system 1 through evaporation, and/or onto a heating plate. The drainage portion 14 may be connected to an external drain to discharge the condensate outside the system 1.

In embodiments, the water supply 3 is provided by a connection to the water mains. The water from the water supply 3 can be used downstream of the cooler 10 for preparing a liquid foamed product, for instance in a manner as described in WO-A1-2014/069993 and/or in WO-A1-2016/043590. That is to say the water can be heated, pressurized and mixed with the milk concentrate to form a liquid food product flow that passes the bubble generator 5. The liquid food product flow is then aerated by the dry air through the bubble generator 5 to prepare a liquid food product, in particular a foamed liquid food product, such as milk foam or froth.

In embodiments, the cooler 10 can be in fluid connection with a coolant supply 20 to cool said cooler 10. In this case, the cooler 10 can be in fluid connection with an external coolant supply 20, such as the water supply 3. The cooler can comprise a cooler inlet 20A for fluid connection with said coolant supply 20 and can comprise a cooler outlet 20B for dispensing of the coolant. Preferably, the cooler inlet 20A can be connected to the water mains and the cooler outlet 20B can be connected to the water inlet 104 of the coupling device 100, such that the water from the water mains can be used efficiently by first cooling the cooler 10 before being used downstream of the cooler 10 as described in the manner above. Alternatively, the cooler inlet 20A and cooler outlet 20B can be connected in a loop with a cooling device being provided to cool the coolant or the cooler outlet 20B can be connected to a coolant dispenser for dispensing the coolant outside the system.

In embodiments according to the invention, the system can comprise a sensor 21 for measuring the relative humidity of the incoming air as shown in FIG. 4C. The sensor 21 can comprise a humidity control unit 22 to regulate the relative humidity of the incoming air, or at least of the air in or near the air supply space 24. The humidity control unit 22 regulates the relative humidity of the incoming air by drying the incoming air with the air drying device 7 and/or by supplying dry air from the container 8 containing pre-dried air and/or mixing the two. The humidity control unit 22 preferably can regulate the relative humidity being supplied to the bubble generator 5 to be below 90%, such as, for instance below 80%, 75% or 70%, at least when the air is introduced to the liquid food product flow through the bubble generator.

It is noted that for the purpose of clarity and a concise description features are described herein as part of the same or separate embodiments, however, it will be appreciated that the scope of the disclosure may include embodiments having combinations of all or some of the features described.

Further, it is noted that the invention is not restricted to the embodiments described herein. It will be understood that many variants are possible. Such and other variants will be apparent for the person skilled in the art and are considered to lie within the scope of the invention as formulated in the following claims.

LIST OF REFERENCE SIGNS 1 system
2 milk supply
3 water supply
4 air supply
5 bubble generator
6 air inlet
6A filter
7 air drying device
8 container containing pre-dried air
9 compressor
10 cooler
11 condensation device
12 inlet channel portion
13 outlet channel portion
14 drainage portion
15 first channel portion
16 second channel portion
17 valve
19 condensate container
20 coolant supply
20A coolant inlet
20B coolant outlet
20C coolant channel portion
21 sensor
22 humidity control unit
23 wall
24 air supply space
25 water pump
26 heater
100 coupling device
101 first channel portion
102 second channel portion
103 first end of the first channel portion
104 water inlet
105 outlet
106 second end of the first channel portion
107 second end of the second channel portion
108 chamber
109 milk inlet
I open position
II closed position

The invention claimed is:

1. A system for aerating a liquid food product, comprising:
 (i) a bubble generator for generating bubbles in a liquid food product flow, the bubble generator comprising a wall having gas transmissive pores separating an air supply space from the liquid food product flow,
 (ii) an air supply for supplying air to the air supply space, the air supply comprising:
  (a) an air drying device for drying the air to be supplied to the air supply space and/or
  (b) a container containing pre-dried air arranged for supplying dried air to the air supply space, and
 (iii) a controller configured to operate a valve to allow condensate to (a) drain passively during a liquid food aerating cycle and during standby of the system and (b) drain actively after the liquid food aerating cycle,
wherein the air has a relative humidity below 70%.

2. The system according to claim 1, wherein the air drying device dehumidifies the air.

3. The system according to claim 1, wherein the air supply is provided with a compressor for supplying air under pressure to the bubble generator.

4. The system according to claim 1, wherein the air drying device is in fluid connection with the compressor and the bubble generator and is located between the compressor and the bubble generator.

5. The system according to claim 1, wherein the air drying device comprises a cooler for cooling the air.

6. The system according to claim 5, wherein the cooler comprises an inlet channel portion, an outlet channel portion, and a drainage portion.

7. The system according to claim 6, wherein the inlet channel portion is connected to the drainage portion through a first channel portion and the outlet channel portion is connected to the first channel portion through a second channel portion.

8. The system according to claim 6, having a flow path between the inlet channel portion and the drainage portion that is substantially straight.

9. The system according to claim 6, wherein the cooler is provided with the valve, which is an open default valve, and the controller, which is arranged for closing the valve.

10. The system according to claim 9, wherein the valve is adjustable from an open position in which the inlet channel portion is in fluid connection with the drainage portion to a closed position in which the connection to the drainage portion is closed by the controller during the liquid food product aerating cycle.

11. The system according to claim 6, wherein the air drying device comprises a container for collecting the condensate, and wherein the container is in fluid connection with the drainage portion, or the drainage portion is in fluid connection with ambient atmosphere.

12. The system according to claim 5, wherein the cooler is in fluid connection with a coolant supply to cool the cooler.

13. The system according to claim 12, wherein the coolant supply is an external coolant supply.

14. The system according to claim 1, wherein the air supply comprises a sensor for measuring the relative humidity of incoming air, the sensor comprising a humidity control unit to regulate the relative humidity of the incoming air by drying the incoming air with the air drying device and/or supplying dry air from the container containing pre-dried air.

15. A method for preparing a liquid food product, comprising:
   (a) drying incoming air and/or supplying the incoming air with dry air to produce dried incoming air;
   (b) supplying the dried incoming air to the liquid food product, and
   (c) controlling a valve of a system for aerating the liquid food product to allow condensate to (i) drain passively during a liquid food aerating cycle and during standby of the system and (ii) drain actively after the liquid food aerating cycle,
   wherein the air has a relative humidity below 70%.

16. The method according to claim 15, wherein the liquid food product is a foamed liquid food product.

17. The method according to claim 15, wherein the dried incoming air is supplied to the liquid food product via a bubble generator.

18. The method according to claim 15, wherein the incoming air is compressed incoming air.

19. The method according to claim 15, comprising closing the valve, which is an open valve, at the start of the liquid food product aerating cycle using the controller and opening the valve at the end of the liquid food product aerating cycle such that the condensate is blown out when the pressure after a serving is relieved.

* * * * *